United States Patent [19]

Ayres

[11] Patent Number: 4,921,250
[45] Date of Patent: May 1, 1990

[54] FRANGIBLE ARTICLE

[76] Inventor: John A. Ayres, 4679 Lippincott Rd., Lapeer, Mich. 48446

[21] Appl. No.: 258,373

[22] Filed: Oct. 17, 1988

[51] Int. Cl.⁵ .......................... A63B 37/00; F41J 5/00; F41J 9/16

[52] U.S. Cl. .................................. 273/58 R; 273/317; 273/378; 273/406; 273/407

[58] Field of Search ...................... 273/58 R, 362, 363, 273/364, 378, 380, 406, 407, 404, 58 J, 317

[56] References Cited

U.S. PATENT DOCUMENTS

| | | | |
|---|---|---|---|
| 595,738 | 12/1897 | Sherman | 273/362 |
| 2,948,534 | 8/1960 | Huszar | 273/58 J X |
| 3,469,411 | 9/1969 | Silva | 273/362 X |
| 3,840,232 | 10/1974 | Ludwig et al. | 273/362 |
| 4,243,228 | 1/1981 | Marcella | 273/378 |
| 4,247,116 | 1/1981 | McQuary | 273/407 |
| 4,623,150 | 11/1986 | Moehlman et al. | 273/362 |
| 4,697,807 | 10/1987 | Boundy | 273/380 X |

Primary Examiner—Anton O. Oechsle
Attorney, Agent, or Firm—Brooks & Kushman

[57] ABSTRACT

A frangible article for use as a target or a projectile is disclosed which is formed of a mixture of sand and decomposable binder shaped and cured to create a rigid, durable article which will fracture upon impact. Several preferred binder compositions and the method of forming a frangible target are also disclosed.

30 Claims, 2 Drawing Sheets

FRANGIBLE ARTICLE

FIELD OF INVENTION

This invention relates to frangible articles formed of sand and more particularly to sand-based articles formed using a decomposable binder.

BACKGROUND

Frangible targets are commonly used in skeet and trap shooting and are referred to as clay pigeons. Typical clay pigeons are formed of a mixture of a lime based chalk and a pitch, phenyl-resinous biteumen. Broken clay pigeons pose environmental problems as they are not readily decomposable and may be toxic if eaten by animals. Recognizing the environmental problems, there have been efforts in the past to develop nontoxic frangible targets as shown in U.S. Pat. Nos. 4,124,550 and 4,568,087. None of these targets have been readily accepted in the commercial marketplace.

Frangible targets, in order to be competitive in the commercial marketplace, need to be formed of inexpensive materials and exhibit consistent fracture characteristics. Where the targets are to be thrown such as in trap and skeet, it is very important that the targets weight and flight characteristics be consistent as well. It is therefore important that targets should absorb as little moisture as possible as moisture tends to affect both the weight and frangibility.

While frangible targets are quite common, frangible projectiles are virtually unknown. Projectiles for firearms, BB guns, pellet guns and slingshots are typically formed of metal such as lead, copper or steel and in the case of slingshots, glass. The common characteristics of these projectiles is that they tend to ricochet. The ricochet problem is most troublesome when shooting in a confined area. Shooting a BB gun or a slingshot indoors can be particularly dangerous if a stray shot hits a solid object. While lead projectiles have less of a propensity to ricochet particularly at acute angles, lead is expensive and poses environmental hazards.

OBJECTS, FEATURES AND ADVANTAGES OF THE INVENTION

It is an object of the present invention to provide a frangible article for use as a target or a projectile which is bio-degradable and non-toxic.

It is yet another object of the invention to provide a frangible article with consistent frangibility and resistance to moisture absorption.

Yet another object of the present invention is to provide a projectile suitable for slingshots and the like which can be used indoors without fear of ricocheting.

An advantage of the present invention is that low cost bio-degradable materials are used to form the frangible article and consistent frangibility characteristics are achieved thereby.

SUMMARY OF INVENTION

A frangible article has been developed for use as a target or a projectile using a mixture of sand and a decomposable binder. The sand binder mixture can be formed as desired and cured to create a rigid, durable article which will fracture into a plurality of dull pieces upon impact. A preferred composition of the binder is a mixture by weight of 20-60% grain flour, 15-30% salt, ½-5% petroleum distillate and water.

One embodiment of the invention is a frangible silhouette target formed by mixing of the sand and binder into a dough-like consistency, forming the dough-like mix into a sheet, cutting a series of silhouette shapes and drying the shapes to form rigid, durable targets. Preferably, the target is then coated with a sealant to prevent moisture absorption.

Another alternative embodiment of the invention is a projectile formed of a frangible sand decomposable binder mixture. The projectile is rigid and durable and consistently fractures into a plurality of dull pieces upon impact. The projectile has particularly utility for use as slingshot ammunition.

These objects and novel characteristics of the invention will become further apparent from a review of the accompanying drawings and detailed description of the preferred embodiment.

BRIEF DESCRIPTION OF THE PREFERRED EMBODIMENT

Figure 1:
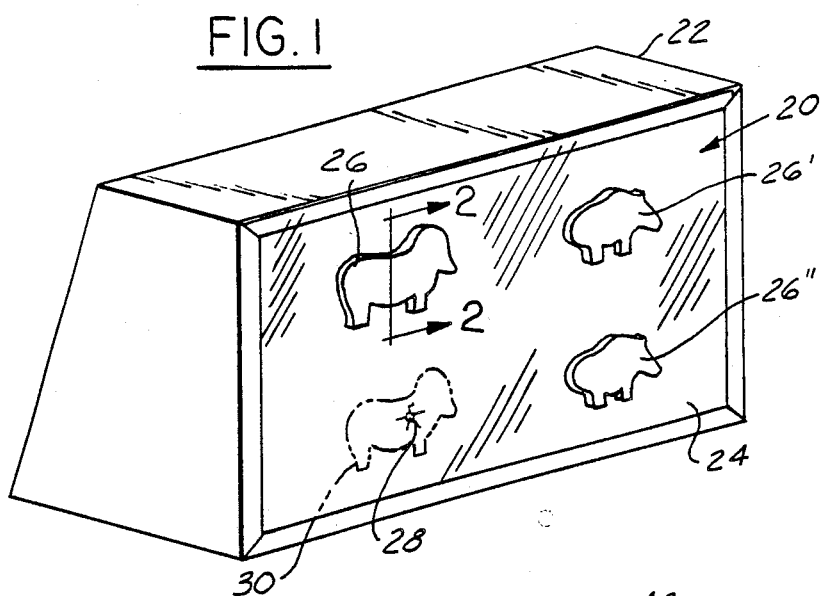
FIG. 1 is a perspective view of a sheet target mounted on a pellet trap having a plurality of frangible silhouettes affixed thereto.

Referring generally to the drawings, a number of alternative embodiments of a frangible article for use as a target or a projectile are shown. FIGS. 1-7 and 10 show various silhouette targets designed for use with BB, pellet or small caliber guns. The targets are highly frangible and fracture upon impact by a projectile. The target fragments are bio-degradable and alleviate the environmental problems posed by many other frangible targets.

A preferred target composition is a mixture of clean screened sand and an organic grain base binder. The sand when mixed with a binder forms a dough-like mix which can then formed into various shapes and dried in an oven. The preferred sand is screened to remove both large and small granules. Preferably, the sand will be screened to remove substantially all of the granules outside of the 0.1 to 0.5 millimeter grain size range. The grain size is determined optically measuring the maximum cordal length of the grain. Sand outside of the range will work, however, very fine sand causes drying time to be unnecessarily long and the use of coarse sand results in a crumbly mixture which is difficult to process.

An example of a preferred binder is a mixture by weight of: 20-60% grain flour, 5-30% salt, ½-5% lubricant and water. Preferably, fungicide such as borax which would also be included representing approximately 1 to 2% by weight of the binder mixture. A drying agent such as alum or the like may also be added to improve the workability and texture of the binder mixture. The binder and sand are mixed together in sufficient quantities to achieve a dough-like mixture. Sufficient binder must be added so that the mixture is not too crumbly and sufficient sand must be present to minimize the drying time and the amount of shrinkage. Wheat flour is preferred for cost reasons but other grain flours or starches work satisfactorily. A light oil such as petroleum distillate or vegetable oil preferably acts as the lubricant and prevents the mixture from becoming sticky. Kerosene or other light petroleum distillates satisfactorily perform this function. The preferred salt has the grain size of table salt so as to quickly dissolve.

Once the sand and binder have been blended together, it is next formed into sheets using conventional rolling or extruding techniques. The sheet is then cut-up using a die or the like to create target preforms. The process is somewhat similar to making cookies with a cookie cutter. The shaped preforms are then dried using conventional convection oven batch or conveyor design. Alternatively, the preforms may be dried in a hot press operation where a heated die set will not only dry the preform but impart shape thereto. Other drying techniques are also possible such as dielectric heating. Care should be taken so that the drying rate is sufficiently slow to enable moisture to escape from the drying article without forming internal steam pockets which would fracture or weaken the article.

Once dried and cooled, the targets may be handled. The finished targets will be hard and durable but will readily fracture upon impact. The targets, however, are susceptible to moisture absorption and should be treated with a sealant. The targets in their natural state will be the color of sand. To prevent moisture absorption, the targets are preferably coated with a bio-degradable sealant such as wax or the like. Varnish or non-toxic paint can also be used to seal the target. Sealants could be omitted, however, if the targets were packaged in small plastic bags to keep them dry such as used in the food packaging industry.

Figure 9:
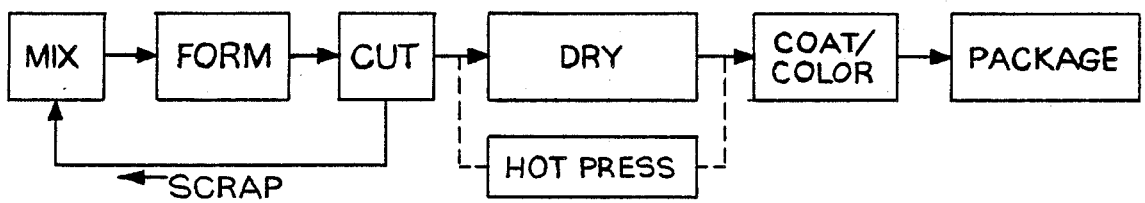
FIG. 9 is a block diagram showing a method of manufacturing frangible articles.

In order to enhance the target visibility, at least one side of the silhouette target should be painted. After the coloring and sealing steps is completed the targets can then be packaged. The general method of forming the targets is shown in FIG. 9. While the steps are shown in their preferred sequence, it should be noted that the sequence may not be performed in order and, for example, the coloring step may take place prior to drying. The scrap resulting from the preformed cutting operation can be recycled by adding the scraps to the new mixture being formed.

A second example of a preferred binder is a mixture by weight of 20-60% grain starch, 5-30% flour, ½-5% petroleum distillate and water. Like the first example, fungicide and drying agent can be added to reduce bacterial growth and enhance workability. The resulting frangible article made using the second binder example similarly exhibits excellent durability and fracture characteristics. The preferred starch is corn starch but other grain starches perform adequately.

Figure 2:
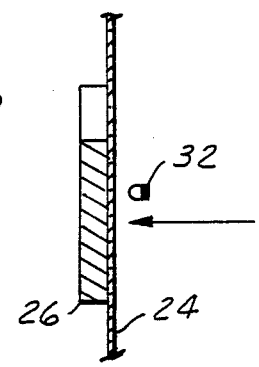
FIG. 2 is a cross-sectional view taken along lines 2—2 in FIG. 1.

Several examples of targets utilizing a frangible sand and decomposable binder mixtures are shown in the drawings. FIG. 1 shows a target 20 mounted in a bullet trap 22. Target 20 is formed of a clear plastic film 24 having bonded thereto a series of frangible silhouettes 26, 26' and 26''. The lower left silhouette has been shot from the target by a projectile which entered through bullet hole 28. In the preferred embodiment shown, the outline of the silhouette is shown by imprint 30 enabling the shooter to determine the relative position of the bullet hole to the silhouette. As shown in FIG. 2 cross-section, the silhouettes 26 are located on the inside of plastic film 24. Plastic film 24 not only serves as a means for vertically supporting the frangible targets but it also prevents target fragments from being thrown back toward the shooter. The film also serves an important function of recording the bullet location relative to the silhouette. When shooting at typical metallic silhouettes or other frangible articles, only a hit or a miss is recorded and the shooter has little opportunity to learn where the bullet went. The target shown in FIG. 1 combines the advantages of shooting paper targets with the fun and excitement of shooting frangible articles without any of the safety and environmental problems associated therewith.

Figure 3:
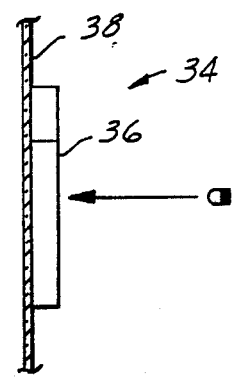
FIG. 3 is a cross-sectional side view of an alternative embodiment of the invention.

An alternative target 34 is shown in FIG. 3. Target 34 utilizes a silhouette 36 bonded to the front surface of a sheet 38. Sheet 38 can be formed of paper or other material such as plastic or the like. Use of paper as a supporting sheet enables background graphics to be used in conjunction with the silhouette. The backing, however, no longer serves to contain target fragments and bullet holes are no longer clean as a result of the target fragments being pushed through the support sheet upon impact.

Figure 4:
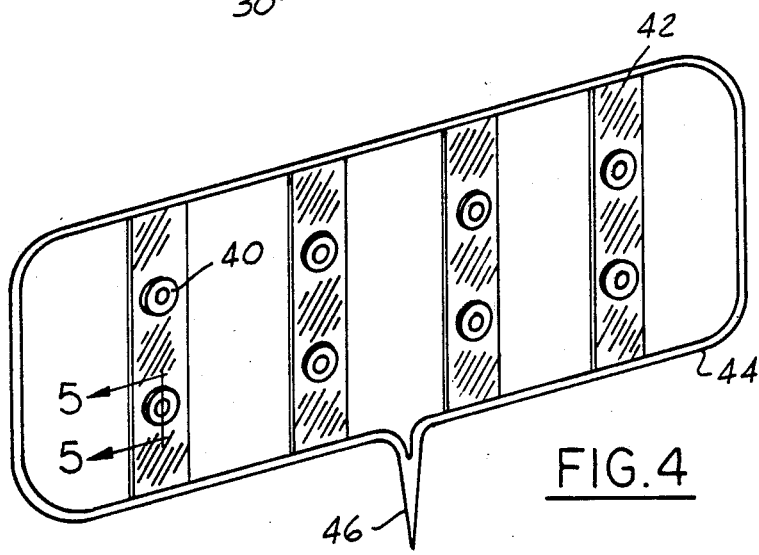
FIG. 4 is a perspective view of yet another embodiment of the invention.
Figure 5:
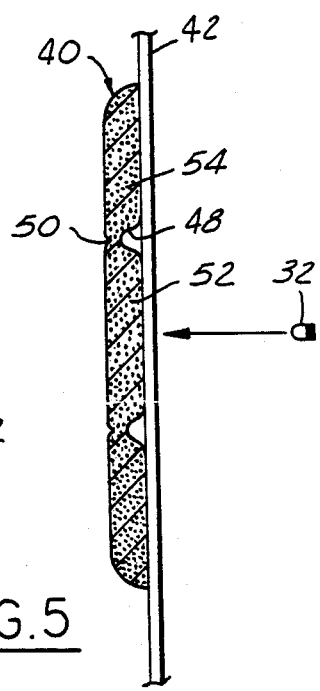
FIG. 5 is a cross-sectional side view taken along lines 5—5 in FIG. 4.

The frangibility of the silhouette can be varied as desired by controlling the silhouette shape, thickness and composition. To control the fracture pattern, it is also possible to score the target surface to encourage fractures to occur along a pre-established line. FIG. 4 and FIG. 5 show an alternative embodiment of the invention. A plurality of frangible silhouette disks 40 are suspended on a thin sheet 42 held in a wire frame 44. Wire frame 44 is provided with a central stake section 46 to enable the frame to be placed in the ground for outdoor shooting. Film 42 is preferably a wide band of clear plastic tape to which the frangible disks 40 are attached by the user. As the disks are shot, new disks can be added and the tape need only be replaced infrequently when it becomes too badly torn or it loses adhesive characteristics.

As shown in FIG. 5, the disks are preferably positioned on the inside of the tape relative to pellet 32 so that minimal damage is done to the tape as a result of the impact. The target disk 40 is scored by concentric grooves 48 and 50 opposite the sides of the target. The grooves 48 and 50 which score the target disk serve to control the target fracture pattern. Groove 48 divides the disk into two regions, a central circular bullseye 52 and a surrounding circumferential range 54. When pellet 32 strikes the bullseye 52, a fracture will occur along the root of groove 48 and a central bullseye portion of the target will be dislodged leaving circumferential ring 54 attached to film 42. When the pellet strikes a portion of the circumferential ring, the ring will fracture dislodging a portion of the ring leaving the bullseye in a semi-circular segment of the ring remaining. By utilizing grooves to score a frangible target, a break pattern can be controlled to increase the number of times a target can be shot and to add more fun and variety to target shooting.

Figure 6:
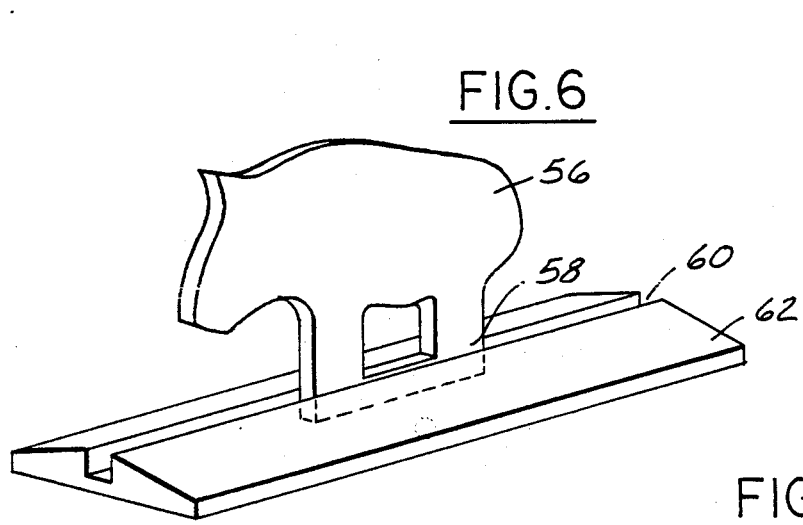
FIG. 6 is respective view of a silhouette target held by a free-standing base.
Figure 7:
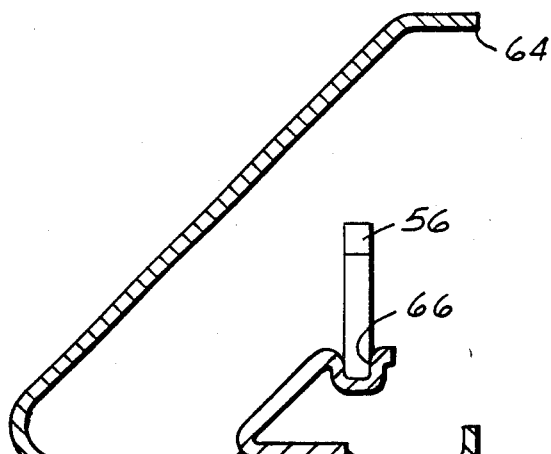
FIG. 7 is a cross-sectional side elevation of a bullet trap holding a frangible silhouette target.

Another embodiment of the invention is shown in FIGS. 6 and 7. A frangible silhouette target 56 is provided in the shape of an animal. A silhouette is a generally planar sheet having a lower marginal edge 58 sized to fit into groove 60 and base 62 shown in FIG. 6. Silhouette 56 can alternatively be supported in bullet trap 64 shown in FIG. 7 with the lower marginal edge of the silhouette being within a groove 66 sized to receive the silhouette. A free-standing base 62 shown in FIG. 6 is inexpensive and can be easily extruded from plastic and is ideal for outdoor shooting. The bullet trap embodiment shown in FIG. 7 represents a possible structure for vertically supporting a frangible target for indoor usage. It should be appreciated that numerous base or support structures can be fabricated to temporarily support a frangible target and FIGS. 6 and 7 merely illustrate two preferred embodiments.

Figure 10:
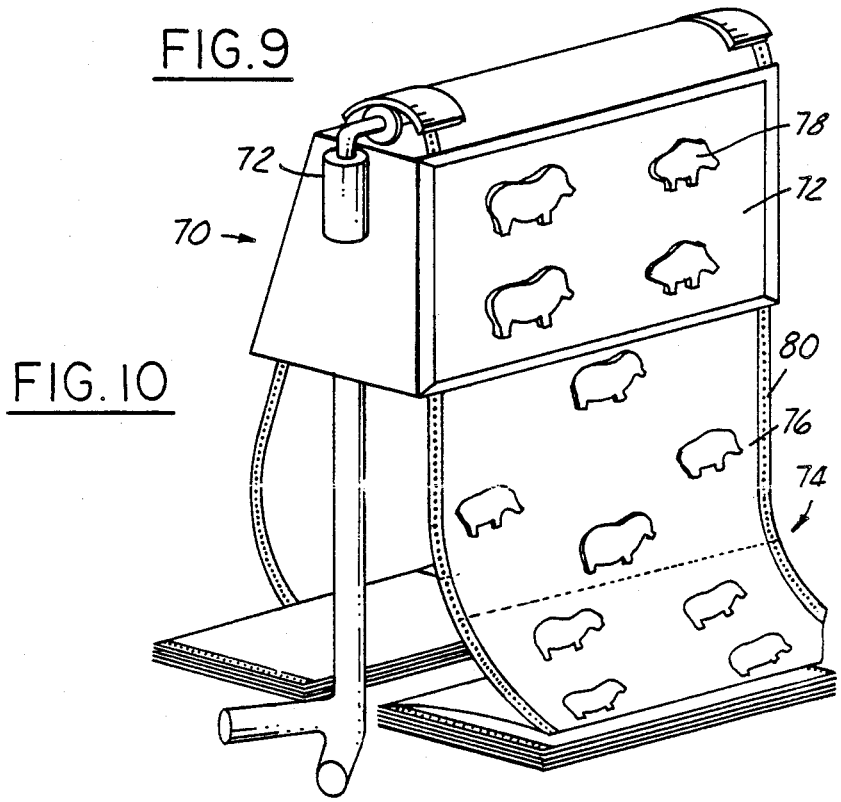
FIG. 10 is a perspective view of a alternative embodiment of the invention showing frangible targets mounted on fan-fold paper used in conjunction with a bullet trap having an automatic target advance mechanism.

An alternative embodiment of the invention is adapted for use with an automatic target feeder as shown in FIG. 10. Bullet trap 70 is provided with a motorized target advance mechanism 72 for automatically changing the target. The target 74 consists of a plurality of fan-fold pages 76 having frangible silhouettes 78 bonded thereto. The fan-fold pages 76 are provided with perforated marginal edges 80 for cooperation with the motor advance mechanism. After the targets in front of the bullet trap have been shot, the user can activate the motor advance mechanism to advance the target 74 to the next page 76 having a new set of silhouettes contained thereon. The silhouettes preferably stagger from page to page to minimize the height of the folded target pages.

While the targets shown are of the silhouette type, it should be appreciated that flying targets such as clay pigeons can be fabricated using the previously described method and compositions. Clay pigeons would be best made using a hot pressing method to shape and dry the preform.

Figure 8:
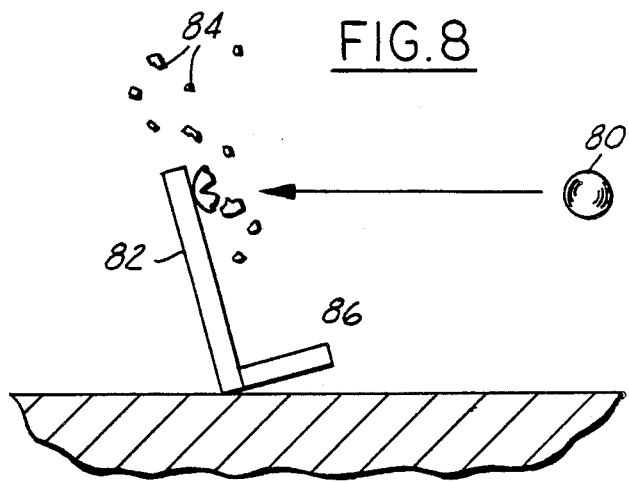
FIG. 8 is a side view representing a frangible projectile striking the metallic silhouette.

An embodiment of the invention for use as a frangible projectile is shown in FIG. 8. Spherical projectile 80 is illustrated immediately before and immediately after impact with silhouette 82. Upon impact with the silhouette, the projectile fractures into a plurality of dull pieces 84. The silhouette is provided with a base 86 to support the silhouette in a generally upright position to allow the silhouette to topple over upon being struck by a projectile. The projectile shown is adapted to be used as slingshot ammunition. The preferred sphere size is within the range of 6–20 millimeters in diameter.

Spherical projectile 80 is formed by a frangible composition of sand and decomposable binder to provide a rigid, durable projectile which can readily withstand the forces extended thereon while being shot from a slingshot. Upon impact with a rigid object, the projectile fractures into dull pieces which do not pose an environmental hazard and readily decay when exposed to the elements of outdoors. The projectile is preferably formed of the compositions previously described and is provided with a sealant to prevent moisture absorption. It is also advantageous to color the projectiles to enhance the visibility of the projectile in flight. A fluorescent yellow or orange color enables the flight of the projectile to be tracked both against dark and light backgrounds and significantly improves the shooters ability to observe the path of the high speed projectile.

Projectiles of the present embodiment can also be used in other applications such as in firearms, however, the sealant or protective layer needs to be applied to the projectile to prevent the sand from scoring the bore of the gun.

It should be understood of course that while the invention herein shown and described constitutes a preferred embodiment of the invention, it is not intended to illustrate all possible forms thereof. Frangible articles of varying shapes or compositions can be created by one of ordinary skill in the art without departing from the spirit and scope of the invention disclosed and claimed.

What is claimed is:

1. A frangible target comprising:
a mixture of sand and a decomposable binder which is formed and cured to a desired target shape, said binder comprising by weight:
20–60% grain flour;
5–30% salt;
½–5% petroleum lubricant; and
water.

2. The invention of claim 1 wherein said sand grain size falls substantially within the range of 0.1 to 0.5 millimeters.

3. The invention of claim 1 wherein the binder further comprises a fungicide.

4. The invention of claim 1 wherein the binder further comprises a drying agent for improving the workability of the mixture.

5. The invention of claim 1 further comprising a sealant for coating the target to prevent moisture absorption.

6. The invention of claim 5 wherein said sealant comprises wax.

7. The invention of claim 1 wherein said frangible article is formed in the shape of a planar silhouette.

8. The invention of claim 7 wherein the planar surface of the target is scored to control the break pattern.

9. The invention of claim 7 further comprising support means for vertically supporting the frangible target.

10. The invention of claim 9 wherein said support means further comprises a thin sheet bonded to and substantially co-planar with the target.

11. The invention of claim 10 wherein said thin sheet comprises a plurality of thin fold sheets each having at least one target affixed thereto, said sheets having perforated marginal edges for automatically positioning the targets.

12. The invention of claim 9 wherein said support means further comprises a base having a groove formed therein to receive the lower marginal edge of the target therein.

13. The invention of claim 1 wherein the lubricant comprises a light oil.

14. A frangible target, comprising:
a mixture of sand and a decomposable binder which is formed and cured to a desired target shape, said binder comprising by weight:
25–60% starch;
5–30% grain flour;
½–5% petroleum lubricant; and
water.

15. The invention of claim 14 further comprising a sealant coating the target to prevent moisture absorption.

16. The invention of claim 14 wherein said frangible article is formed in the shape of a planar silhouette.

17. A frangible target comprising:
- a mixture of sand and a decomposable binder formed in a shape of a planar silhouette and cured to create a rigid, durable target which will fracture upon impact by a projectile;
- a sealant for coating the target to prevent moisture absorption; and
- a transparent plastic film for supporting the silhouette in a vertical position and having the outline of the silhouette imprinted thereon.

18. The invention of claim 17 wherein the planar silhouette target is scored to control the break pattern.

19. A frangible projectile comprising a mixture of sand and a decomposable binder which is formed into a projectile shape and cured to create a rigid, durable projectile which will fracture into a plurality of dull pieces upon impact, said decomposable binder comprising:
- 20–60% grain flour;
- 5–30% salt;
- ½–5% lubricant; and
- water.

20. The invention of claim 19 wherein said sand grain size falls substantially within the range of 0.1 to 0.5 millimeters.

21. The invention of claim 19 wherein said shape is substantially spherical with a diameter in the 6 to 20 millimeter range.

22. The invention of claim 19 further comprising a sealant for coating the projectile to prevent moisture absorption.

23. The invention of claim 22 wherein said sealant further comprises a coloring agent to enhance projectile visibility in flight.

24. A frangible target comprising:
- a mixture of sand and a decomposable binder formed in a shape of a planar silhouette and cured to create a rigid, durable target which will fracture upon impact by a projectile;
- a sealant for coating the target to prevent moisture absorption; and
- a plurality of thin folded sheets each having at least one silhouette bonded thereto; said sheets having perforated marginal edges for automatically positioning the silhouettes in the vertical position.

25. The invention of claim 24 wherein the planar silhouette target is scored to control the break pattern.

26. A frangible projectile comprising a mixture of sand and a decomposable binder which is formed into a projectile shape and cured to create a rigid, durable projectile which will fracture into a plurality of dull pieces upon impact, said decomposable binder comprising:
- 25–60% starch;
- 5–30% grain flour;
- ½–5% lubricant; and
- water.

27. The invention of claim 26 wherein said sand grain size falls substantially within the range of 0.1 to 0.5 millimeters.

28. The invention of claim 26 wherein said projectile shape is substantially spherical with a diameter in the 6 to 20 millimeter range.

29. The invention of claim 26 further comprising a sealant for coating the projectile to prevent moisture absorption.

30. The invention of claim 29 wherein said sealant further comprises a coloring agent to enhance projectile visibility in flight.

* * * * *